US011822630B2

(12) United States Patent
Upadhyay

(10) Patent No.: US 11,822,630 B2
(45) Date of Patent: Nov. 21, 2023

(54) SYSTEM AND METHOD FOR SECURELY ACCESSING A USER ACCOUNT

(71) Applicant: Gaurav Upadhyay, Hyderabad (IN)

(72) Inventor: Gaurav Upadhyay, Hyderabad (IN)

(73) Assignee: Gaurav Upadhyay

( * ) Notice: Subject to any disclaimer, the term of this patent is extended or adjusted under 35 U.S.C. 154(b) by 0 days.

(21) Appl. No.: 17/269,273

(22) PCT Filed: Jan. 13, 2021

(86) PCT No.: PCT/IB2021/050201
§ 371 (c)(1),
(2) Date: Feb. 18, 2021

(87) PCT Pub. No.: WO2021/152408
PCT Pub. Date: Aug. 5, 2021

(65) Prior Publication Data
US 2022/0358192 A1 Nov. 10, 2022

(30) Foreign Application Priority Data
Jan. 28, 2020 (IN) .............................. 202041003728

(51) Int. Cl.
*G06F 21/31* (2013.01)
*G06V 10/75* (2022.01)
*H04L 9/08* (2006.01)
(52) U.S. Cl.
CPC .............. *G06F 21/31* (2013.01); *G06V 10/75* (2022.01); *H04L 9/08* (2013.01)

(58) Field of Classification Search
None
See application file for complete search history.

(56) References Cited

U.S. PATENT DOCUMENTS 8,488,877 B1  7/2013  Owechko et al.
10,157,504 B1 * 12/2018  Jain ..................... G06F 16/5838
(Continued)

OTHER PUBLICATIONS

IBM Watson Visual Recognition; Aug. 2018; retrieved from https://www.ibm.com/support/customer/csol/terms/?id=i128-0026&lc=en#detail-document on Jun. 28, 2023 (Year: 2018).*

(Continued)

*Primary Examiner* — James R Turchen
(74) *Attorney, Agent, or Firm* — Jason C. Cameron

(57) ABSTRACT

A system for securely accessing a user account is disclosed. The system includes an environmental data subsystem to receive a set of environmental data representative of an environment from sensors, wherein the set of environmental data includes a first set of environmental data received at a first time instant and a second set of environmental data received at a second time instant; an environment identification subsystem to extract a first set of unique features of the environment from the first set of environmental data and a second set of unique features of the environment from the second set of environmental data; an environmental data comparison subsystem to compare the second set of unique features with the first representation of the first set of unique features, to determine similarities between the second set of unique features and the first representation, to generate a confidence score based on the similarity analysis.

8 Claims, 4 Drawing Sheets

(56) References Cited

U.S. PATENT DOCUMENTS

| | | | | |
|---|---|---|---|---|
| 10,832,485 | B1* | 11/2020 | Mantri | G06F 3/017 |
| 11,042,625 | B2* | 6/2021 | Bojan | G06F 21/32 |
| 11,409,856 | B2* | 8/2022 | Maresh | G06F 21/36 |
| 2009/0190798 | A1* | 7/2009 | Lee | G06V 10/809 |
| | | | | 382/103 |
| 2013/0135081 | A1* | 5/2013 | McCloskey | A63F 13/213 |
| | | | | 340/5.8 |
| 2016/0188861 | A1* | 6/2016 | Todeschini | G06F 3/017 |
| | | | | 726/7 |
| 2017/0200007 | A1* | 7/2017 | Drummond | G06F 9/4416 |
| 2017/0316186 | A1* | 11/2017 | Breitenfeld | G06F 3/04815 |
| 2018/0341779 | A1* | 11/2018 | Sawant | G06F 21/31 |
| 2020/0026842 | A1* | 1/2020 | Jain | G06F 21/316 |
| 2020/0134158 | A1* | 4/2020 | Mullins | G06F 21/34 |
| 2020/0250403 | A1* | 8/2020 | Xiao | G06V 40/168 |

OTHER PUBLICATIONS

Bertacchi M, Silveira I, Omar N. A comparative analysis of the evolution of the ibm watson's visual recognition api on android. In2017 Workshop of Computer Vision (WVC) Oct. 3, 20170 (pp. 120-125). IEEE. (Year: 2017).*

Guan Pang, Ulrich Neumann; 3D point cloud object detection with multi-view convolutional neural network; Published on Dec. 4 and 8, 2016.

Adrian Rosebrock; Measuring distance between objects in an image with OpenCV; Published on on Apr. 4, 2016.

* cited by examiner

SYSTEM AND METHOD FOR SECURELY ACCESSING A USER ACCOUNT

EARLIEST PRIORITY DATE

This National Phase application claims priority from a Complete patent application filed in India having Patent Application No. 202041003728 filed on Jan. 28, 2020 and titled "SYSTEM AND METHOD FOR SECURELY ACCESSING A USER ACCOUNT" and PCT Application No. PCT/IB2021/050201 filed on Jan. 13, 2021, titled "SYSTEM AND METHOD FOR SECURELY ACCESSING A USER ACCOUNT"

BACKGROUND

Embodiments of the present disclosure relate to a user authentication system and more particularly to a system and a method for securely accessing a user account.

Secure information system permit one or more users to gain access to the information system based on verification of identity of the one or more users. The users need to prove their identity using credentials such as a username and a password. Authentication plays a major role in ensuring security of the information system by verifying the credentials provided by the one or more users and allowing one or more authorized users to gain access to the information system. Various authentication schemes such as authentication based on alphanumeric passwords, biometric passwords, graphical passwords and the like are available which are utilised by a system to authenticate the one or more users to access a plurality of online user accounts.

One such conventional system is available which includes a graphical authentication scheme to authenticate the one or more users to access the plurality of accounts. Such a conventional system requires an involvement of a user for selection of one or more point of interest regions in a picture to set as the graphical password and reproducing similar point of regions correctly in future for accessing the plurality of user accounts. However, such a conventional system requires remembering the point of regions of the picture selected by the user which is a tedious and a difficult task. Also, such a conventional system is unable to automatically recognise in real-time an environment or objects present in the environment. Moreover, such system is unable to relate a recognised object with a recognised place within the environment. Furthermore, such systems upon mapping identified object with the scene of the real-time environment generates erroneous results which reduces accuracy of the system.

Hence, there is a need for an improved system and a method for securely accessing a user account to operate the same in order to address the aforementioned issues.

BRIEF DESCRIPTION

In accordance with one embodiment of the present disclosure, a system for securely accessing a user account is disclosed. The system includes an environmental data subsystem configured to receive a set of environmental data representative of an environment from one or more sensors, wherein the set of environmental data includes a two-dimensional representation, a three-dimensional point cloud representation of the environment, or a combination thereof. The set of environmental data includes a first set of environmental data which is received at a first time instant and a second set of environmental data which is received at a second time instant. The system also includes an environment identification subsystem configured to extract a first set of unique features of the environment from the first set of environmental data and a second set of unique features of the environment from the second set of environmental data. The system also includes an environment database configured to store a first representation of the first set of unique features of the environment extracted from the first set of environmental data. The system also includes an environmental data comparison subsystem configured to compare the second set of unique features extracted from the second set of environmental data with the first representation of the first set of unique features stored in the environmental database. The environmental data comparison subsystem is also configured to determine similarities between the second set of unique features and the first representation of the first set of unique features. The environmental data comparison subsystem is also configured to generate a confidence score based on the similarity analysis between the second set of unique features and the first representation of the first set of unique features. The system also includes an account access subsystem configured to generate a key based on the confidence score to enable secure access to the user account.

In accordance with another embodiment of the present disclosure, a method for securely accessing a user account is disclosed. The method includes receiving, by an environmental data subsystem, a set of environmental data representative of an environment from one or more sensors, wherein the set of environmental data includes a two-dimensional representation, a three-dimensional point cloud representation of the environment, or a combination thereof, wherein a first set of environmental data is received at a first time instant and a second set of environmental data is received at a second time instant. The method also includes extracting, by an environment identification subsystem, a first set of unique features of the environment from the first set of environmental data and a second set of unique features of the environment from the second set of environmental data. The method also includes storing, at an environment database, a first representation of the first set of unique features of the environment extracted from the first set of environmental data. The method also includes comparing, by an environment comparison subsystem, the second set of unique features extracted from the second set of environmental data with the first representation of the first set of unique features stored in the environmental database. The method also includes determining, by the environment comparison subsystem, similarities between the second set of unique features and the first representation of the first set of unique features. The method also includes generating, by the environment comparison subsystem, a confidence score based on the similarity analysis between the second set of unique features and the first representation of the first set of unique features. The method also includes generating, by an account access subsystem, a key based on the confidence score to enable secure access to the user account.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
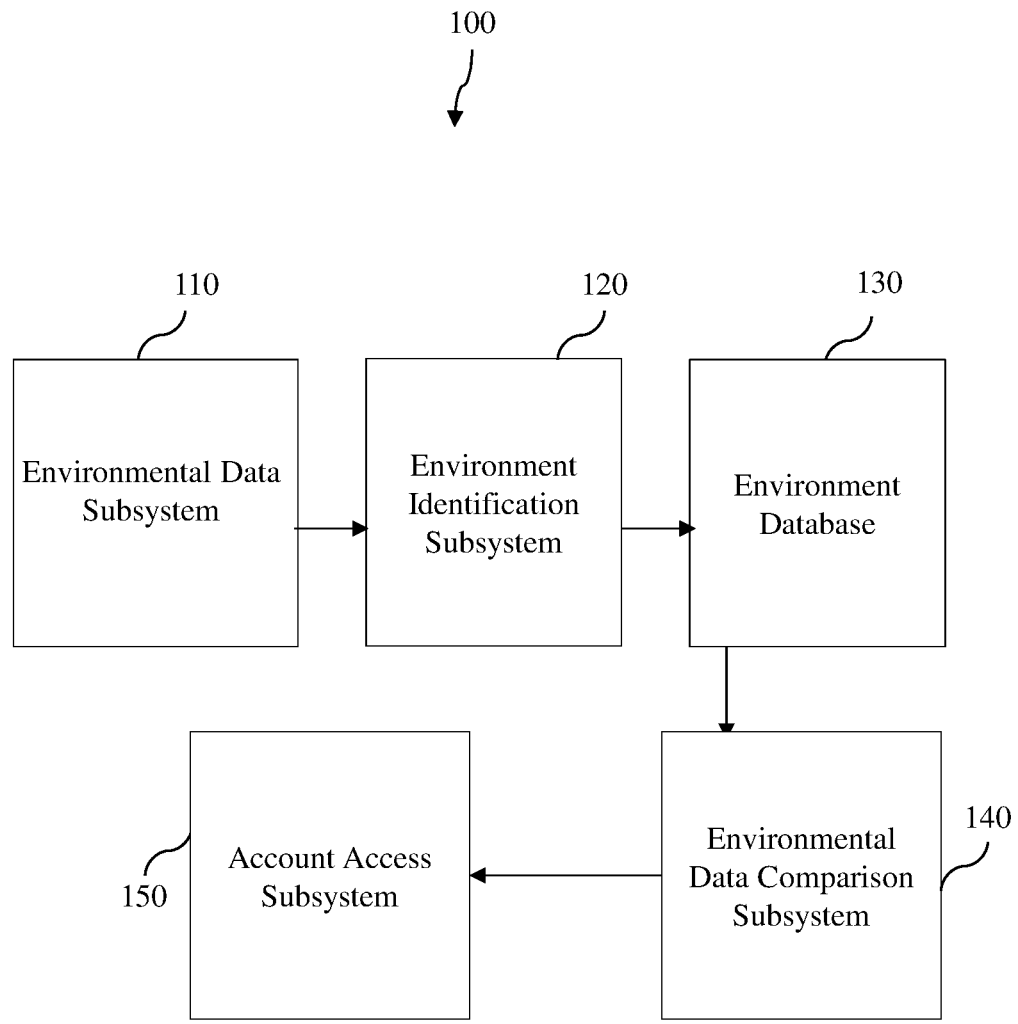
FIG. 1 is a block diagram of a system for securely accessing a user account in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for securely accessing a user account. The system includes an environmental data subsystem configured to receive a set of environmental data representative of an environment from one or more sensors, wherein the set of environmental data includes a two-dimensional representation, a three-dimensional point cloud representation of the environment, or a combination thereof. The set of environmental data includes a first set of environmental data which is received at a first time instant and a second set of environmental data which is received at a second time instant. The system also includes an environment identification subsystem configured to extract a first set of unique features of the environment from the first set of environmental data and a second set of unique features of the environment from the second set of environmental data. The system also includes an environment database configured to store a first representation of the first set of unique features of the environment extracted from the first set of environmental data. The system also includes an environmental data comparison subsystem configured to compare the second set of unique features extracted from the second set of environmental data with the first representation of the first set of unique features stored in the environmental database. The environmental data comparison subsystem is also configured to determine similarities between the second set of unique features and the first representation of the first set of unique features. The environmental data comparison subsystem is also configured to generate a confidence score based on the similarity analysis between the second set of unique features and the first representation of the first set of unique features. The system also includes an account access subsystem configured to generate a key based on the confidence score to enable secure access to the user account.

FIG. 1 is a block diagram of a system 100 for securely accessing a user account in accordance with an embodiment of the present disclosure. The system 100 includes an environmental data subsystem 110 configured to receive a set of environmental data representative of an environment from one or more sensors, wherein the set of environmental data includes a two-dimensional representation, a three-dimensional point cloud representation of the environment, or a combination thereof. The set of environmental data includes a first set of environmental data which is received at a first time instant and a second set of environmental data which is received at a second time instant. As used herein, the term 'first set of environmental data' is defined as the environmental data which is received from the one or more sensors during registration process by a user, for setting a password to create a representation and to securely access the user account. Similarly, the term 'second set of environmental data' as used herein, is defined as the environmental data which is received from the one or more sensors at different instant of time when the user wants to log in the user's account based on a similar representation of the environment.

In one embodiment, the one or more sensors may include a LIDAR (light detection and ranging), or a camera. In some embodiment, the two-dimensional representation may include an image captured by the camera. In another embodiment, the three-dimensional point cloud representation of the environment may include a three-dimensional map of the environment. The environmental data subsystem is also configured to eliminate presence of the one or more physical objects.

The system 100 also includes an environment identification subsystem 120 configured to extract a first set of unique features of the environment from the first set of environmental data and a second set of unique features of the environment from the second set of environmental data. In one embodiment, the environment includes the one or more physical objects, or the one or more virtual objects inserted in the environment based on an input received from the user. The environment identification subsystem 120 is also configured to extract one or more unique features representative of the one or more physical objects and the one or more virtual objects to form the first set of unique features and the second set of unique features at the first time instant and the second time instant, respectively.

As used herein, the term 'first set of unique features' are defined as features of the environment corresponding to the 3D point cloud data or the 2D image which is received at the first time instant. In one embodiment, the first set of unique features corresponding to the 3D point cloud data may include one or more three dimensional coordinates of the one or more objects present in the environment. In another embodiment, the first set of unique features corresponding to the 2D image may include one or more parameters of the image of the environment. Similarly, the term 'second set of unique features' are defined as one or more features which are extracted from a similar environment, wherein the one or more features correspond to the second set of the environmental data which is received at the second time instant such as either 3D point cloud data or the 2D image. In some embodiment, the second set of unique features corresponding to the 3D point cloud data may include one or more three dimensional coordinates of the one or more objects present in the environment. In another embodiment, the second set of unique features corresponding to the 2D image may include one or more parameters of the image of the environment.

As used herein, the term 'one or more virtual objects' are defined as computer generated objects which has no physical existence within the scene of the environment. In some embodiment, the input may be received from the user though a user interface of an electronic device associated with the user. In such embodiment, the electronic device associated with the user may include at least one of a mobile phone, a tablet, a laptop, a desktop, a personal digital assistant (PDA) and the like.

The system 100 also includes an environment database 130 configured to store a first representation of the first set of unique features of the environment extracted from the first set of environmental data. As used herein, the term 'first representation' is defined as a presentation or a depiction of the image of the environment at the first time instant. In one embodiment, the first representation of the first set of unique features may include the three-dimensional map of the environment in x-y-z coordinates when the first set of environmental data is 3D point cloud data. In another embodiment, the first representation of the first set of the environmental data may include a representation of the environment in a form of image when the second set of environmental data includes the 2D image The environment database 130 also stores a processed version of the features of the 3d or the 2d data with or without the original 3d/2d data itself.

The system 100 also includes an environmental data comparison subsystem 140 configured to compare the second set of unique features extracted from the second set of environmental data with the first representation of the first set of unique features stored in the environmental database 130. In one embodiment, the first set of unique features may include stored features corresponding to the first set of the environmental data. In another embodiment, the second set of unique features may include new features extracted from the second set of environmental data, wherein the new features may include at least one of new point clouds or new parameters of the image of the environment.

The environmental data comparison subsystem 140 is also configured to determine similarities between the second set of unique features and the first representation of the first set of unique features. The environmental data comparison subsystem 140 in case of the three-dimensional point cloud data, determines similarities between the second set of unique features and the first set of unique features based on computation of a distance between the one or more objects present in the environment by using one or more distance computation techniques. Similarly, the environmental data comparison subsystem 140 in case of the 2D image, determine similarities between the second set of unique features and the first set of unique features based on a vision memory. As used herein, the term 'vision memory' is defined as a relationship between perceptual processing and the encoding, storage and retrieval of the resulting neural representations. In one embodiment, the vision memory may be implemented using a convolutional neural network CNN model.

The environmental data comparison subsystem 140 is also configured to generate a confidence score based on the similarity analysis between the second set of unique features and the first representation of the first set of unique features. The system 100 also includes an account access subsystem 150 configured to generate a key based on the confidence score to enable secure access to the user account. The account access subsystem 150 enables the secured access to the user when a generated confidence score attains a predetermined threshold limit of confidence score. Also, the account access subsystem may disable the access of the user account associated with the user when the computed confidence score forfeits from the predetermined threshold limit of confidence score. In one embodiment, the user account associated with the user may include at least one of an online social media account associated with the user, an online shopping account associated with the user, an online bank account associated with the user, an online travel organisation account associated with the user or a combination thereof.

Figure 2:
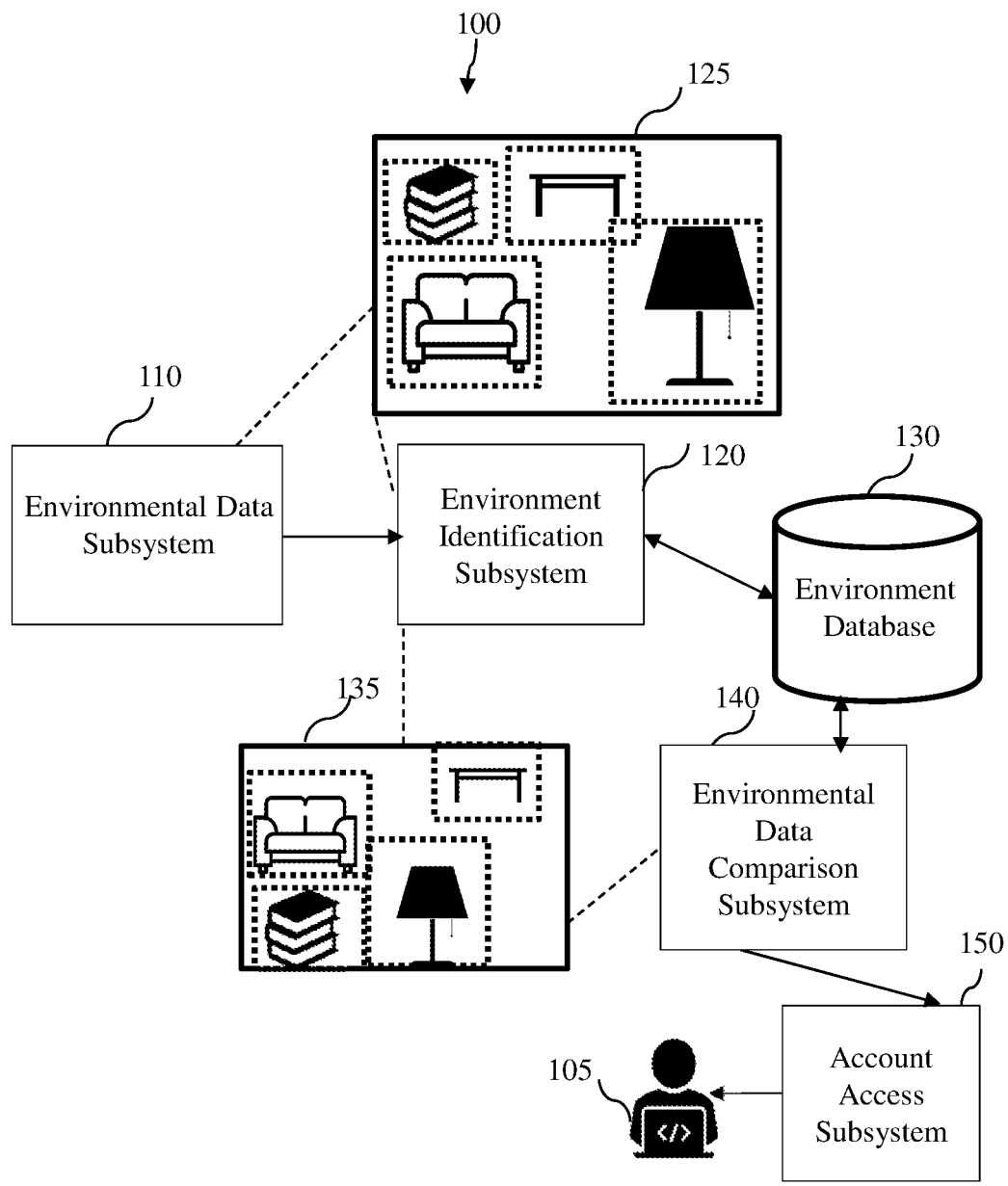
FIG. 2 is a schematic representation of an exemplary embodiment of a system for securely accessing a user account of FIG. 1 in accordance with the embodiment of the present disclosure.

FIG. 2 is a schematic representation of an exemplary embodiment of a system 100 for securely accessing a user account of FIG. 1 in accordance with the embodiment of the present disclosure. The system 100 helps a user 105 in securely accessing at least one of an online user account by creating a unique representation of an environment. Considering an example, where the user 105, has a plurality of online user accounts with corresponding plurality of credentials. Now, if the user 105 forgets the corresponding plurality of credentials, then the user 105 may not be able to access the plurality of accounts. In such a scenario, a unique sign, an evidence or a feature needs to be recollected or reproduced through which the plurality of accounts may be accessed by the user 105. The system 100 in such a scenario helps in creating the unique representation of the environment and determining similarities between the unique features of the environment based on which the user 105 may be enabled to access the plurality of accounts.

For example, the user 105, in one scenario, in order to access one of the user account sets a password associated with unique representation of the environment of his or her room. Then in such a scenario, for creation of the unique representation, at a first time instant during the registration process, an environment data subsystem 110 receives a first set of environmental data representative of the environment from one or more sensors. Here, the two-dimensional representation includes a two-dimensional (2D) image of the environment such as the room and the three-dimensional representation (3D) representation includes 3D point cloud data of the environment. For example, the first set of the environmental data may be received from either a LIDAR or a camera sensor.

Now, once, the first set of the environmental data is received, an environment identification subsystem 120 extracts a first set of unique features, wherein the first set of the unique features may include one or more unique features representative of one or more physical objects and one or more virtual objects present in the environment at the first time instant. For example, the first set of unique features corresponding to the 3D point cloud data of the environment may include one or more three dimensional coordinates of the one or more objects present in the environment. Similarly, if the input received from the user 105 while the registration process is the 2D image, then the first set of features may include one or more parameters of the image of the environment. Here, the one or more objects may or may not be present in the environment. Again, the one or more virtual objects are computer generated objects which has no physical existence in the environment and may be inserted in the environment through a user interface based on preference of the user 105.

Later, a first representation of the first set of the unique features of the environment which is created at the first-time instant is stored in an environment database 130. The environment database 130 also stores a processed version of the features of the 3d or the 2d data with or without the original 3d/2d data itself. Here, the first representation may be a 3D map of the environment in x-y-z coordinates when the first set of environmental data is 3D point cloud data. Also, the first representation of the first set of the environmental data may include a depiction of the environment in a form of image when the second set of environmental data includes the 2D image.

Now, at a second time instant, when the user 105 again wants to login the same user account, then an approximate representation of the environment which is created at the second time instant requires to be matched with the first representation of the environment. So, again at the second time instant, a second set of environmental data representative of such a similar place or the environment is received from the one or more sensors. Further, a second set of unique features of the similar environment from the second set of the environmental data is also extracted. Here, the second set of the environmental data also should be coherent with the first set of the environmental data. For example, if the first set of the environmental data is the 3D point cloud data, then the second set of the environmental data should be also the 3D point cloud data. Similarly, if the first set of the environmental data is the 2D image, then the second set of the environmental data should be also the 2d image of the environment. Also, the second set of the unique features may include one or more new features such as either the one or more three dimensional coordinates of the one or more objects present in the environment which are extracted from the similar environment at the second time instant or one or more parameters of the image of the environment.

Now, an environmental data comparison subsystem 140 compares the second set of unique features extracted from the second set of environmental data with the first representation 125 of the first set of unique features stored in the environmental database 130. The environmental data comparison subsystem 140 in case of the three-dimensional point cloud data, determines similarities between the second set of unique features and the first set of unique features based on computation of a distance between the one or more objects present in the environment by using one or more distance computation techniques. Similarly, the environmental data comparison subsystem 140 in case of the 2D image, determine similarities between the second set of unique features of the second representation 135 of the environment and the first set of unique features by contextualising the entire property of the image into parameters based on a vision memory. For example, the vision memory may be implemented using a convolutional neural network (CNN) model.

Upon determination of the similarities, a confidence score based on the similarity analysis between the second set of unique features and the first representation of the first set of unique features is generated by the environmental data comparison subsystem 140. For example, if the generated confidence score attains a predetermined threshold limit such as 93 percent (%), then an account access subsystem 150, generates a key based on the confidence score to enable secure access to the user account. Again, if the generated confidence score forfeits from the predetermined threshold limit of confidence score, then the account access subsystem 150 may disable the secured access of the user account by the user 105. As a result, the user 105 may securely access the user account based on the unique representation of the environment and does not need to maintain or remember the plurality of credentials.

Figure 3:
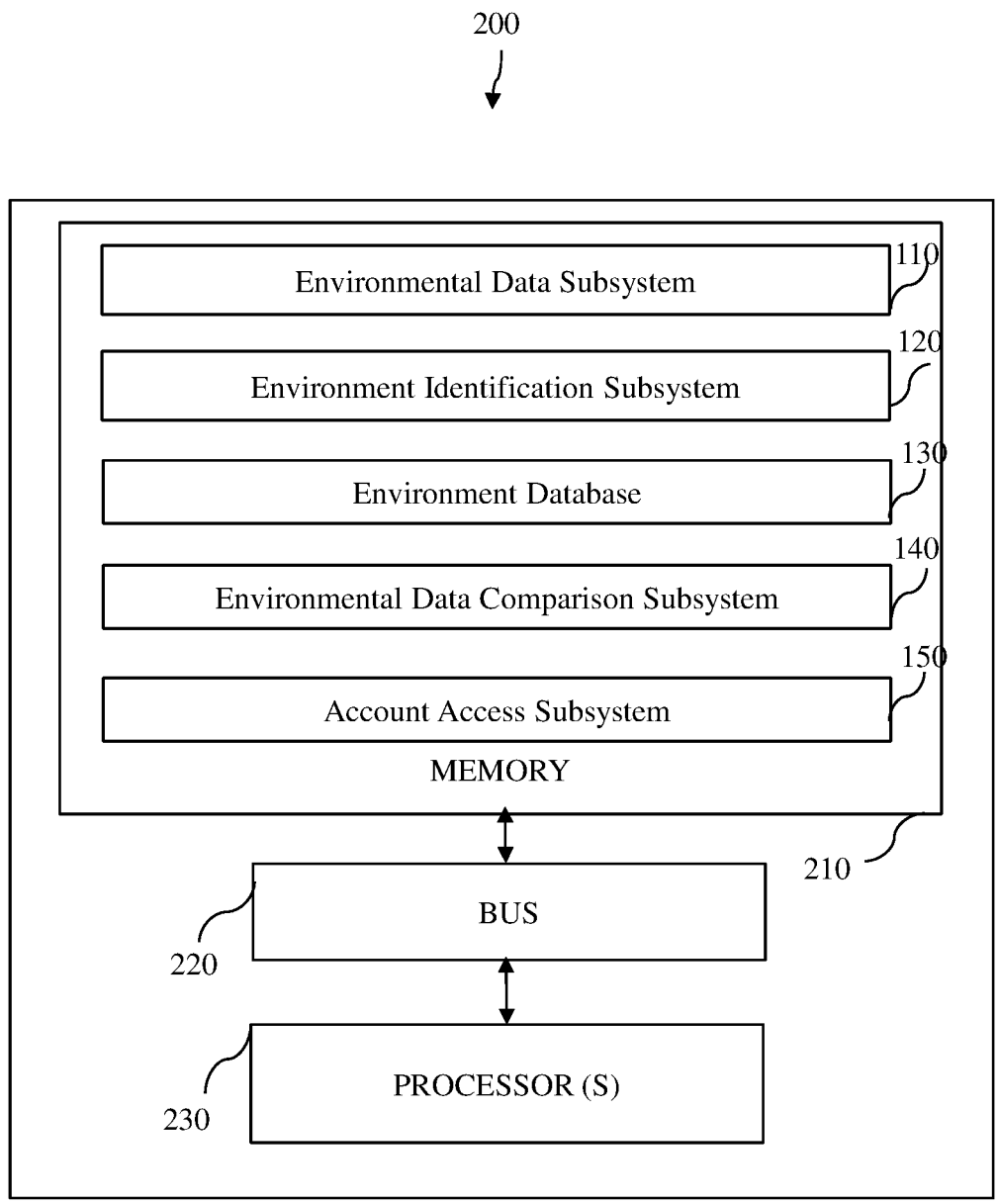
FIG. 3 is a block diagram of a computer or a server in accordance with an embodiment of the present disclosure.

FIG. 3 is a block diagram of a computer or a server in accordance with an embodiment of the present disclosure. The server 200 includes processor(s) 230, and memory 210 operatively coupled to the bus 220.

The processor(s) 230, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 210 includes a plurality of subsystems stored in the form of executable program which instructs the processor 230 to perform the method steps illustrated in FIG. 1. The memory 210 is substantially similar to the system 100 of FIG. 1. The memory 210 has following subsystems: an environmental data subsystem 110, an environment identification subsystem 120, an environment database 130, an environmental data comparison subsystem 140 and an account access subsystem 150.

The system includes an environmental data subsystem 110 configured to receive a set of environmental data representative of an environment from one or more sensors, wherein the set of environmental data includes a two-dimensional representation, a three-dimensional point cloud representation of the environment, or a combination thereof. The set of environmental data includes a first set of environmental data which is received at a first time instant and a second set of environmental data which is received at a second time instant. The environment identification subsystem 120 is configured to extract a first set of unique features of the environment from the first set of environmental data and a second set of unique features of the environment from the second set of environmental data. The environment database 130 is configured to store a first representation of the first set of unique features of the environment extracted from the first set of environmental data.

The environmental data comparison subsystem 140 is configured to compare the second set of unique features extracted from the second set of environmental data with the first representation of the first set of unique features stored in the environmental database. The environmental data comparison subsystem 140 is also configured to determine similarities between the second set of unique features and the first representation of the first set of unique features. The environmental data comparison subsystem 140 is also configured to generate a confidence score based on the similarity analysis between the second set of unique features and the first representation of the first set of unique features. The account access subsystem 150 is configured to generate a key based on the confidence score to enable secure access to the user account.

Figure 4:
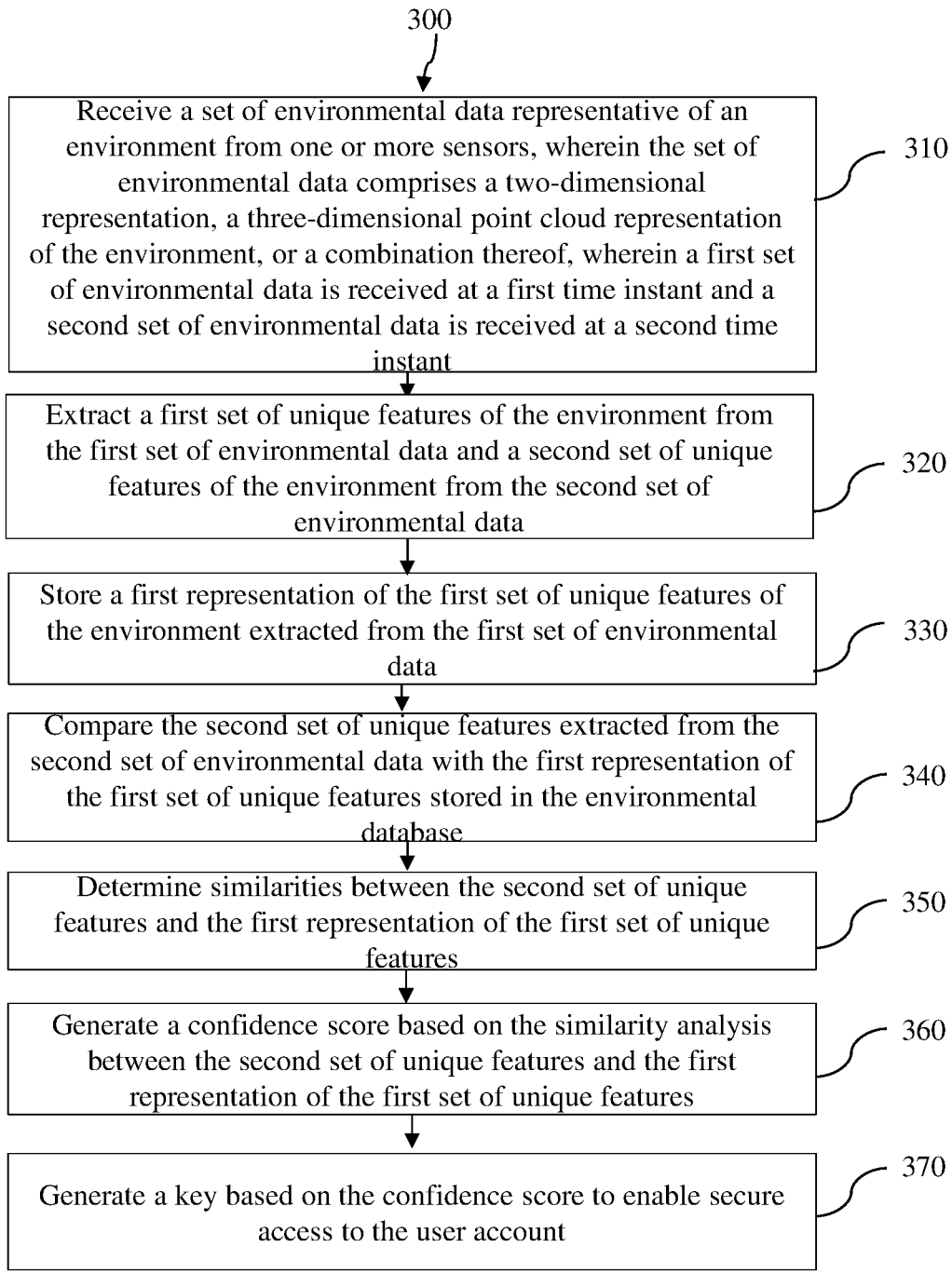
FIG. 4 is a flowchart representing the steps involved in a method for securely accessing a user account of FIG. 1 in accordance with an embodiment of the present disclosure.

FIG. 4 is a flowchart representing the steps involved in a method 300 for securely accessing a user account of FIG. 1 in accordance with an embodiment of the present disclosure. The method 300 includes receiving, by an environmental data subsystem, a set of environmental data representative of an environment from one or more sensors, wherein the set of environmental data includes a two-dimensional representation, a three-dimensional point cloud representation of the environment, or a combination thereof, wherein a first set of environmental data is received at a first time instant and a second set of environmental data is received at a second time instant in step 310. In one embodiment, receiving the set of environmental data representative of the environment from the one or more sensors may include receiving the first set of the environmental data and the second set of the environmental data such as the two-dimensional representation, the three dimensional point cloud representation or a combination thereof at the first time instant and the second time instant respectively from a light detection and ranging (LIDAR) or a camera.

The method 300 also includes extracting, by an environment identification subsystem, a first set of unique features of the environment from the first set of environmental data and a second set of unique features of the environment from the second set of environmental data in step 320. In one embodiment extracting the first set of the unique features and the second set of unique features of the environment from the first set of the environmental data and the second set of the environmental data respectively may include extracting the first set of the unique features and the second set of the unique features which may include, but not limited to, one or more unique features representative of one or more physical objects and one or more virtual objects at the first time instant and the second time instant respectively. In such embodiment, extracting the first set of the unique features from the first set of the environmental data corresponding to the 3D point cloud data may include extracting one or more three dimensional coordinates of the one or more objects present in the environment. In another embodiment, extracting the first set of the unique features from the first set of the environmental data corresponding to the 2D image may include extracting one or more parameters of the image of the environment.

In one embodiment, extracting the second set of unique features corresponding to the 3D point cloud data may also include extracting one or more three dimensional coordinates of the one or more objects present in the environment at the second time instant. In another embodiment, extracting the second set of unique features corresponding to the 2D image may also include extracting the one or more parameters of the image of the environment at the second time instant.

The method 300 also includes storing, at an environment database, a first representation of the first set of unique features of the environment extracted from the first set of environmental data in step 330. In one embodiment, storing the first representation of the first set of the unique features of the environment may include storing a three-dimensional map of the environment in x-y-z coordinates when the first set of environmental data is 3D point cloud data at the environmental database. In another embodiment, storing the first representation of the first set of the unique features of the environment may include storing a depiction of the environment in form of an image when the second set of environmental data includes the 2D image at the environmental database.

The method 300 also includes comparing, by an environment comparison subsystem, the second set of unique features extracted from the second set of environmental data with the first representation of the first set of unique features stored in the environmental database in step 340. In one embodiment, comparing the second set of unique features extracted from the second set of environmental data with the first representation of the first set of unique features may include comparing existing one or more stored features of the environment of the first instant with one or more new features extracted from the second set of environmental data, wherein the new features may include at least one of new point clouds or new parameters of the image of the environment.

The method 300 also includes determining, by the environment comparison subsystem, similarities between the second set of unique features and the first representation of the first set of unique features in step 350. In one embodiment, determining the similarities between the second set of the unique features and the first representation of the first set of the unique features may include determining the similarities between the second set of unique features and the first representation of the first set of unique features based on computation of a distance between the one or more objects present in the environment by using one or more distance computation techniques in case of the three-dimensional point cloud data. In another embodiment, determining the similarities between the second set of the unique features and the first representation of the first set of the unique features may include determining the similarities between the second set of unique features and the first representation of the first set of unique features based on a vision memory in case of the 2D image.

The method 300 also includes generating, by the environment comparison subsystem, a confidence score based on the similarity analysis between the second set of unique features and the first representation of the first set of unique features in step 360. The method 300 also includes generating, by an account access subsystem, a key based on the confidence score to enable secure access to the user account in step 370. In one embodiment, generating the key based on the confidence score may include generating the confidence score to enable the secure access to the user when a generated confidence score attains a predetermined threshold limit of confidence score. In another embodiment, the secured access to the user account associated with the user may be disabled when the computed confidence score forfeits from the predetermined threshold limit of confidence score. In one embodiment, the user account associated with the user may include at least one of an online social media account associated with the user, an online shopping account associated with the user, an online bank account associated with the user, an online travel organisation account associated with the user or a combination thereof.

Various embodiments of the present disclosure enable creation of the unique representation of the environment based on the 3D point cloud data and the 2D image of environment.

Moreover, the present disclosed system captures the scene of the environment by considering the at least one object present across the environment, and considering the error in measurement, error in size of each object and still approximately computing a confidence score to check if a same environment is represented.

Furthermore, the present disclosed system based on recognition of the at least one object present within the environment and by creating the unique representation of the environment generates a master password which further helps the user in accessing the plurality of accounts associated with the user without remembering.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

I claim:

1. A system for securely accessing a user account comprising:
   a processor; and
   a memory coupled to the processor, wherein the memory comprises a set of program instructions in the form of a plurality of subsystems, configured to be executed by the processor, wherein the plurality of subsystems comprise:
   an environmental data subsystem configured to receive a set of environmental data representative of an environment from one or more sensors, wherein the environment comprises at least one of: one or more physical objects and one or more virtual objects inserted in the environment based on an input received from a user, wherein the set of environmental data comprises a two-dimensional representation and a three-dimensional point cloud representation of the environment, and wherein the set of environmental data comprises a first set of environmental data received at a first time instant, and a second set of environmental data received at a second time instant;
   an environment identification subsystem configured to extract a first set of unique features of the environment from the first set of environmental data and a second set of unique features of the environment from the second set of environmental data;
   an environment database configured to store a first representation of the first set of unique features of the environment extracted from the first set of environmental data;
   an environmental data comparison subsystem configured to compare the second set of unique features extracted from the second set of environmental data with the first representation of the first set of unique features stored in the environmental database, wherein the environmental data comparison subsystem is configured to:
      determine similarities between the second set of unique features and the first representation of the first set of unique features based on a vision memory technique and one or more distance computation techniques,
         wherein the similarities are determined using the vision memory technique when the second set of unique features and the first representation of the first set of unique features comprise the two-dimensional representation of the environment,
         wherein the vision memory technique is implemented using a Convolutional Neural Network (CNN) model, and
         wherein the similarities are determined using the one or more distance computation techniques when the second set of unique features and the first representation of the first set of unique features comprise the three-dimensional point cloud representation of the environment; and
      generate a confidence score based on the similarity analysis similarities determined between the second set of unique features and the first representation of the first set of unique features; and
   an account access subsystem configured to generate a key based on the confidence score to enable secure access to the user account.

2. The system as claimed in claim 1, wherein the one or more sensors comprise LIDAR (light detection and ranging), or a camera.

3. The system as claimed in claim 1, wherein the two-dimensional representation comprises an image.

4. The system as claimed in claim 3, wherein the environmental data comparison subsystem is configured to compare the images based on the vision memory technique.

5. The system as claimed in claim 1, wherein the three-dimensional point cloud representation comprises a three-dimensional map of the environment in x-y-z coordinates.

6. The system as claimed in claim 1, wherein the environment identification subsystem is configured to extract one or more unique features representative of the one or more physical objects and the one or more virtual objects to form the first set of unique features and the second set of unique features at the first time instant and the second time instant respectively.

7. The system as claimed in claim 1, wherein the environmental data subsystem is configured to eliminate the presence of the one or more physical objects based on requirement of the user.

8. A method comprising:
   receiving, by a processor, a set of environmental data representative of an environment from one or more sensors, wherein the environment comprises at least one of: one or more physical objects and one or more virtual objects inserted in the environment based on an input received from a user, wherein the set of environmental data comprises a two-dimensional representation and a three-dimensional point cloud representation of the environment, and wherein the set of environmental data comprises a first set of environmental data received at a first time instant, and a second set of environmental data received at a second time instant;

extracting, by the processor, a first set of unique features of the environment from the first set of environmental data and a second set of unique features of the environment from the second set of environmental data;

storing, by the processor, a first representation of the first set of unique features of the environment extracted from the first set of environmental data;

comparing, by the processor, the second set of unique features extracted from the second set of environmental data with the first representation of the first set of unique features stored in the environmental database;

determining, by the processor, similarities between the second set of unique features and the first representation of the first set of unique features based on a vision memory technique and one or more distance computation techniques, wherein the similarities are determined using the vision memory technique when the second set of unique features and the first representation of the first set of unique features comprise the two-dimensional representation of the environment, wherein the vision memory technique is implemented using a Convolutional Neural Network (CNN) model, and wherein the similarities are determined using the one or more distance computation techniques when the second set of unique features and the first representation of the first set of unique features comprise the three-dimensional point cloud representation of the environment;

generating, by the processor, a confidence score based on the similarity analysis similarities determined between the second set of unique features and the first representation of the first set of unique features; and generating, by the processor, a key based on the confidence score to enable secure access to the user account.

* * * * *